United States Patent [19]
Prewitt

[11] 3,730,346
[45] May 1, 1973

[54] SKIMMING SYSTEM
[75] Inventor: Cecil H. Prewitt, Olympia, Wash.
[73] Assignees: Cortland Skinner, Cecil K. Glaze; Cecil H. Prewitt, all of Olympia, Wash.
[22] Filed: Mar. 1, 1971
[21] Appl. No.: 122,600

[52] U.S. Cl. ............................210/242, 210/DIG. 21
[51] Int. Cl. ............................................E02b 15/04
[58] Field of Search..................210/83, 242, DIG. 21

[56] References Cited

UNITED STATES PATENTS

| 3,578,171 | 5/1971 | Usher | 210/DIG. 21 |
| 3,534,859 | 10/1970 | Amero et al. | 210/DIG. 21 |
| 2,876,903 | 3/1959 | Lee | 210/242 |
| 3,595,392 | 7/1971 | Mavkel | 210/242 |

FOREIGN PATENTS OR APPLICATIONS

| 804,368 | 11/1958 | Great Britain | 210/242 |
| 955,879 | 4/1964 | Great Britain | 210/242 |

Primary Examiner—Samih N. Zaharna
Assistant Examiner—T. A. Granger
Attorney—William B. Matthews

[57] ABSTRACT

A system for skimming floating fluids, such as oil and small pumpable debris, from the surface of a body of water includes an elongated sink-like or trough-like skimming unit adapted to be propelled through the water, with means for drawing fluid from the unit and conducting it to a separator for separating the floatable matter from the water. The elongated skimming unit extends laterally of the path along which the unit is propelled through the water and adjustable floatation means are included for controlling the vertical and angular position of the unit in the water. The skimming unit has forward and aft edges lying in the same horizontal plane and maintained at substantially the same height in the water to prevent creation of a bow wave pushing the oil away from the unit and to permit the oil or other floatable fluid to be drawn into the trough across both the forward and aft edges. Flotation and propulsion adjustment means maintain the optimum position of the unit in the water during use.

7 Claims, 10 Drawing Figures

PATENTED MAY 1 1973 3,730,346

INVENTOR
CECIL H. PREWITT

ATTORNEY

INVENTOR.
CECIL H. PREWITT

PATENTED MAY 1 1973 3,730,346
SHEET 3 OF 3
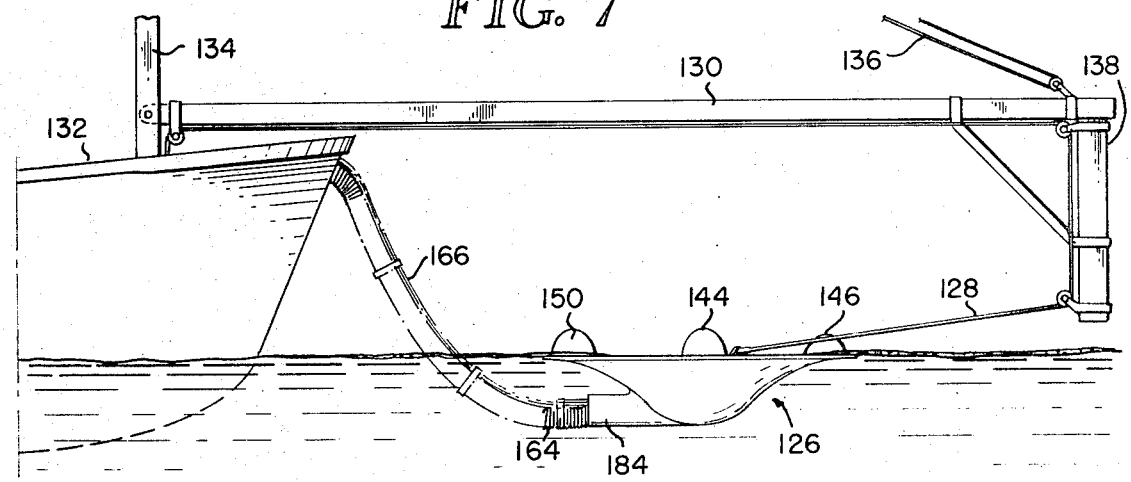
FIG. 7
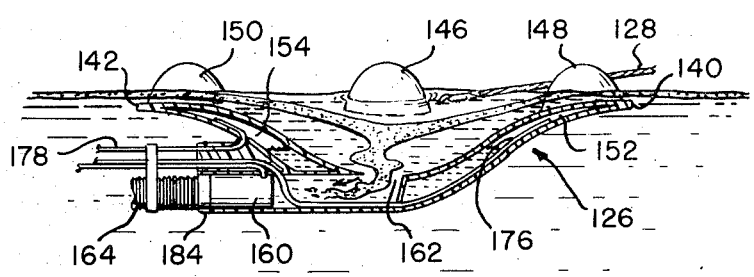
FIG. 8
FIG. 9
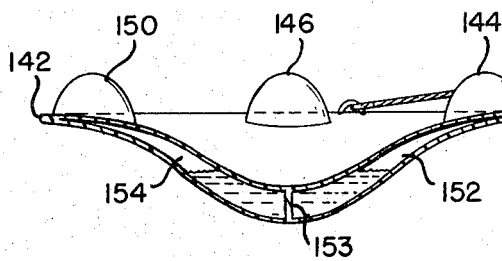
FIG. 10
INVENTOR
CECIL H. PREWITT
BY
Wm B Matthews
ATTORNEY 3,730,346

SKIMMING SYSTEM

BACKGROUND AND SUMMARY OF THE INVENTION

Many devices and systems have been employed in the past for cleaning up oil spills and spillage of other chemicals and substances on bodies of water. The increasing frequency and volume of such spills, particularly of oil spills, and increasing awareness of the ecological impact thereof, render it more and more urgent to find adequate solutions to the clean-up problem.

This invention provides a clean-up device of the skimmer type including a trough-like skimming unit which is moved through the water with its forward lip or edge immediately beneath the surface of the oil slick or other floating substance. One of the principle disadvantages of this type of device in the past has been that the typical construction has caused creation of a bow wave which pushes the oil or other floating chemical away from the skimmer or causes it to pile up, thereby slowing down the skimming process or rendering it ineffective altogether. The present invention seeks to overcome this problem, as well as others critical to a successful skimming apparatus.

Other devices in common use for cleaning up oil spills have included the type which are a part of the mother craft by which they are propelled through the water, such as a barge for storing the skimmed oil. They have therefore not been sufficiently maneuverable and not easily adjusted for height. Further, they have been subject to the bow wave problem to a greater degree in that the craft creates wave conditions which render the skimming of oil from the surface of the water more difficult. Because of their lack of maneuverability, such devices have required auxiliary means for moving oil to the skimmer device, such as floating baffles or the use of fire hoses and the like.

Still other clean-up machines have involved complicated oil absorbing rotors partially submerged in the oil slick with scrapers and conveyers to deliver the oil from the rotors to storage containers. These have involved great expense and mechanical problems resulting in delays.

This invention overcomes these and other problems associated with prior art devices by providing a free floating, preferably self-propelled skimmer unit which is highly maneuverable in front of the mother craft, to which it is connected only by tether lines and flexible hoses. It floats and is maneuvered substantially independently of the mother craft. Accordingly, the oil skimming system according to the invention includes an oil skimming unit, means for propelling the unit through a body of water and permitting it to float substantially independently of the mother craft, flexible conduit means for conducting fluid from the unit to the mother craft, and means aboard the mother craft for separating the floating fluid from the water. The skimming unit itself includes adjustable floatation means for controlling the vertical position of the unit in the water, and an elongated trough extending laterally of the path along which the unit is propelled, the trough having forward and aft horizontal edges lying substantially in the same horizontal plane to avoid creating a bow wave condition and permit the floating fluid to be drawn into the trough across both forward and aft edges. The flotation means includes separately adjustable flotation devices, such as tanks, positioned adjacent opposite ends and fore and aft of the trough. Remote flotation control means are included for adjusting the relative flotation effects at the opposite ends and fore and aft of the trough, as well as the total flotation effects thereof, to adjust both the end-to-end and fore and aft angular position and the height of the skimming unit in the water.

In one embodiment of the skimming unit the flotation means comprise separate tanks contained in cowlings at opposite ends of the trough, which has substantially parallel fore and aft edges. In another embodiment the skimming unit comprises a substantially oval shaped dish of hollow-bodied construction wherein the flotation means include compartments in the hollow body itself. The flotation control means adjusts the amount of ballast fluid within these compartments.

A submersible pump coupled to the skimming unit permits use of a collapsible, highly flexible hose to conduct fluid from the unit to the mother craft by positive pressure, rather than suction, and permits use of a lower horsepower pump than would be required to pull the fluid aboard the mother craft by means of a deck-mounted pump. The output of the pump is controlled in order to adjust the volume of fluid contained in the skimming unit under varying conditions and viscosities of fluids being skimmed. In addition, an automatic adjustment of fluid volume is included to prevent the unit from floating too high or sinking too low by virtue of the weight of the fluid contained in the trough, supplementing the pumping rate adjustment.

Other features of the invention reside in means for propelling the unit through the water, including propulsion means mounted on the unit itself and controlled from the mother craft, or means for tethering the unit to a boom and pulling it through the water ahead of the mother craft with minimum interference with free flotation of the unit independently of the craft.

These and other features, objects and advantages of the invention will become more apparent from the following detailed description of the invention, taken in connection with the accompanying drawings.

BRIEF DESCRIPTION OF THE DRAWINGS:

FIG. 7 is a side elevational view of a second embodiment of the invention wherein the skimmer unit, of different configuration, is towed ahead of the other craft by a boom extending forward thereof.

FIG. 8 is a plan view of the skimming unit embodiment shown in FIG. 7.

FIG. 9 is a sectional view taken in the direction indicated by line 9—9 in FIG. 8.

FIG. 10 is a sectional view taken in the direction indicated by line 10—10 in FIG. 8 (certain background detail omitted).

DETAILED DESCRIPTION OF PREFERRED EMBODIMENTS

The drawings are somewhat diagrammatic of various features and concepts basic to the invention, some of the features and concepts being interchangeable between the illustrated embodiments to form combinations of features other than the specific combinations illustrated. The basic approach in accordance with the invention is to provide a free floating skimmer which is maneuverable ahead of the mother craft and which has its own flotation system, and in some cases its own propulsion system. Thus the skimmer can be maneuvered somewhat ahead of the craft, within the limits of the necessity for control lines and conduit connections to transmit the skimmed substance and water from the skimming unit to the mother craft. Depending on the maneuverability of the craft itself, it is advantageous to be able to steer the skimming unit somewhat independently thereof to clean up different portions of an oil slick, particularly in shallow water or around docks and the like.

It is also essential that the skimming unit be of a light weight construction and easily removed from the water to be transported from one location to another to permit the mother craft to return periodically to the dock or another craft to unload the separated oil or other substance. Hence all of the connections between the mother craft and the skimming unit are loose and flexible.

Figure 1:
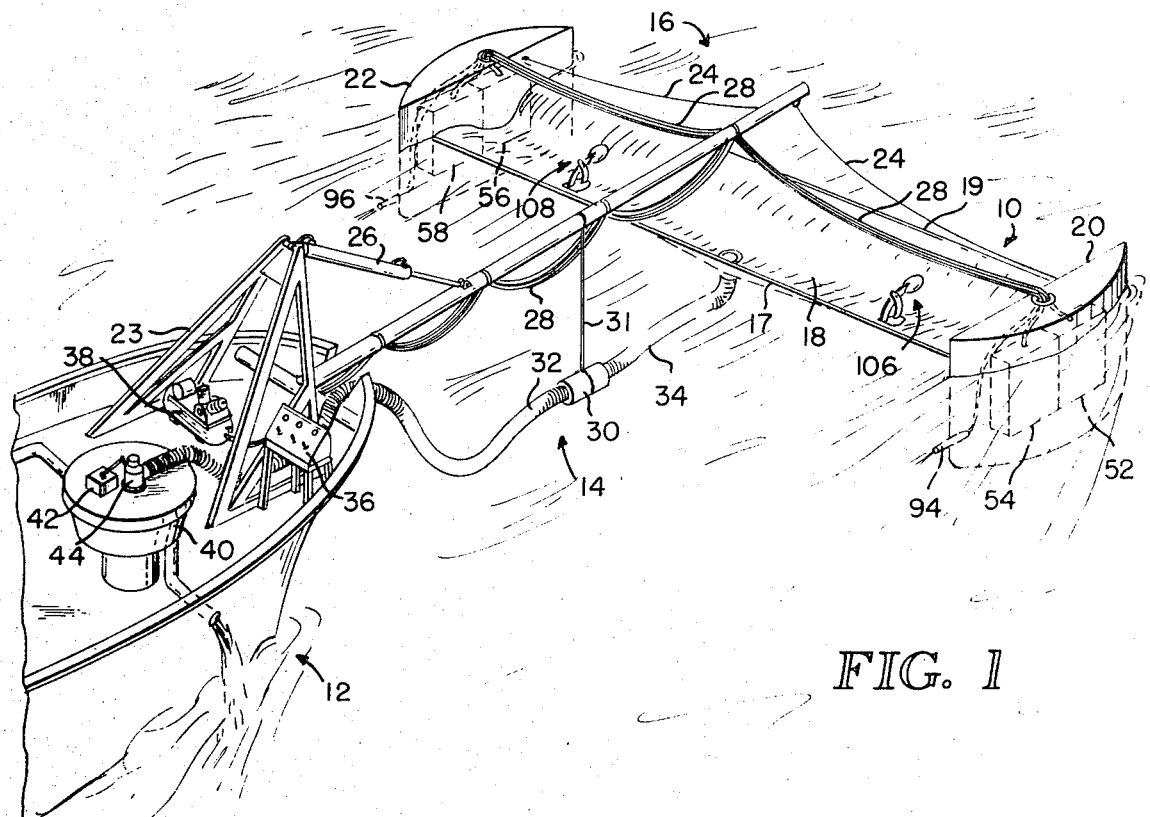
FIG. 1 is an isometric view illustrating the free floating skimmer unit self-propelled ahead of a mother craft, which has a boom to which the skimming unit is tethered for lifting the same out of the water.

FIG. 1 is a somewhat diagrammatic representation of an embodiment of the invention wherein the skimming unit 10 is self-propelled and guided ahead of the mother craft 12 to which it is connected through a flexible conduit assembly 14. It can be lifted from the water by a boom 16 extending from the front of the craft. This embodiment of the skimming unit includes an elongated trough 18 having substantially parallel, horizontal fore and aft edges 17 and 19 and cowlings 20 and 22 at its opposite ends enclosing flotation tanks into which ballast fluid may be pumped to adjust the flotation level of the unit.

The boom 16 may be lifted by the crane structure 23 mounted on the deck of the boat 12, by operation of the hydraulic cylinder 26. The unit is connected to the boom by tethering lines 24. The boom also carries compressed air lines 28 which are connected to the cowlings 20 and 22 at opposite ends of the skimming unit and service flotation or ballast tanks and propulsion system by which the unit is moved and guided.

A flow-through, self-priming submersible pump 30 is mounted in the flexible conduit 14 coupled between the skimming unit and the boat, the pump being suspended from the boom by a tether line 31 so that its weight is not supported by the skimming unit. Power is delivered to the pump by a line (not shown) internal to the flexible conduit 14 or attached to the tether line 31. The flexible hose portion 34 between the pump and the skimming unit must be of the non-collapsible type because of the suction of the pump in this arrangement, whereas portion 32 between the pump and the mother craft may be of the collapsible type. As will be seen, the submersible pump may be mounted directly on the skimming unit to advantage, or it may be mounted aboard the deck of the mother craft, if the disadvantages of that arrangement do not render it unacceptable.

Aboard the craft is a control console 36 by which an operator may control operation of the skimming unit in cooperation with the pilot of the craft. (It should be noted that the system may be operated from a dock on which the console and other equipment may be located.) The control console and other elements of the system shown pictorially in FIG. 1 are shown in block diagram form in FIG. 6. The control console is operable to control the compressor 38, the separator 40, valve control means 42 for adjusting the pump outlet valve 44, flotation and propulsion valves 48 and 49, the hydraulic boom 16 and suitable illumination means 51 (not shown in FIG. 1).

While the separator 40 in FIG. 1 is diagrammatically representative of a centrifuge, the type of separator employed is not critical to this invention, the use of filters or gravity separators being acceptable under some conditions.

The compressor 38 aboard the craft delivers air to a pressure storage tank 46 (FIG. 6) to which the lines 28 are connected through the flotation valves 48, propulsion valves 49 and supply line 50.

The flotation tanks include fore and aft tanks 52 and 54 in the right-hand end cowling 20 and fore-and-aft tanks 56 and 58 in the left-hand cowling 22. See FIGS. 1 to 4. Compressed air is supplied to or withdrawn from these four tanks by air lines 60, 62, 64 and 68, respectively. Lines 62 and 64 pass through a water tight grommet 70 in the top of the right-hand cowling 20 and lines 66 and 68 pass through a similar grommet 72 in the top of the left-hand cowling 22. The respective tanks have bottom openings 74, 76, 78 and 80 through which water is drawn into or forced out of the tanks individually as the air pressure therein is adjusted.

Figure 6:
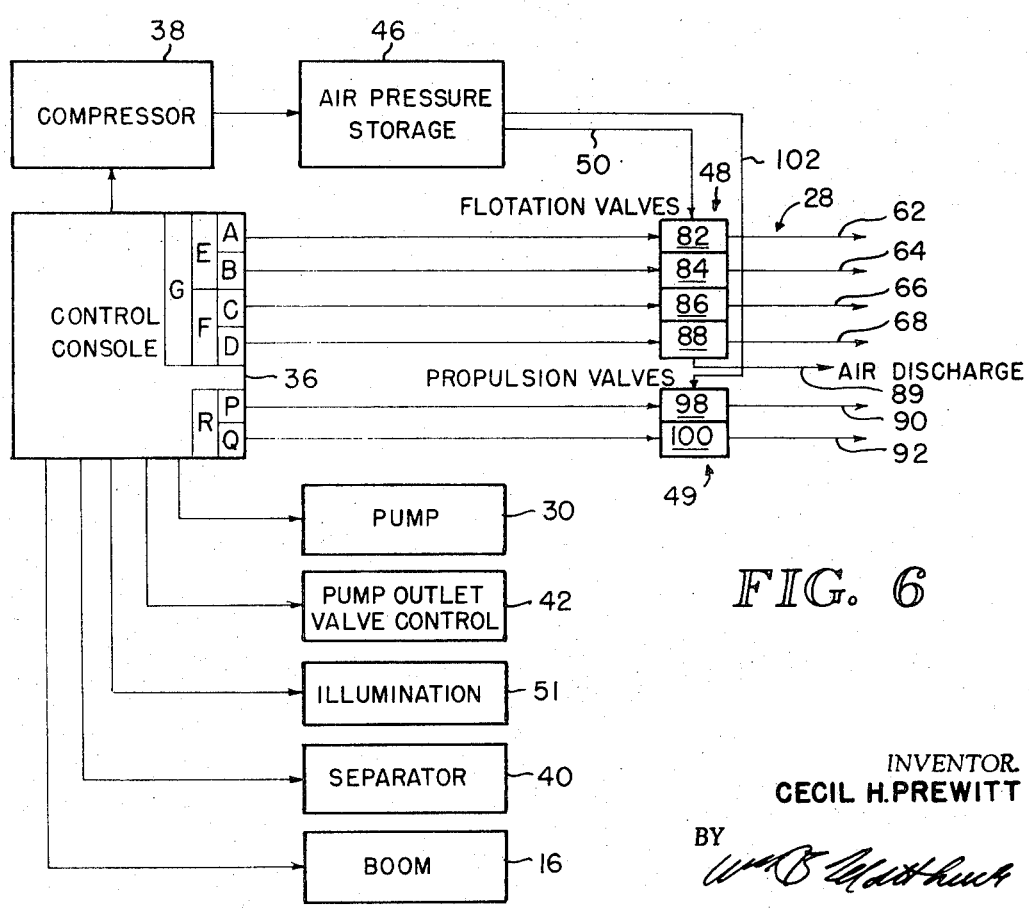
FIG. 6 is a block diagram of the control system in accordance with the invention.

The respective pressure adjustments are made under control of the console 36 by flotation valves 82, 84, 86 and 88 shown in FIG. 6. Air withdrawn from the tanks is discharged through the common discharge line 89. The console includes individual controls A and B for adjusting relative pressures in the right-hand fore and aft tanks 52 and 54, and individual controls C and D for adjusting the relative pressures in the left-hand fore and aft tanks 56 and 58. These controls permit adjustment of the fore and aft angularity or pitch of the skimmer as it is moved through the water. Separate controls E and F for adjusting the relative pressures in the right and left-hand pairs of tanks permit any necessary adjustment in the right-left (lateral) angularity of the skimmer, and an overall control G permits adjusting the pressures in all of the tanks simultaneously (regardless of their pre-existing relative pressures) to adjust the overall flotation level of the skimmer. These controls may simply comprise levers which the operator may manipulate individually, in pairs or all together.

Figure 3:
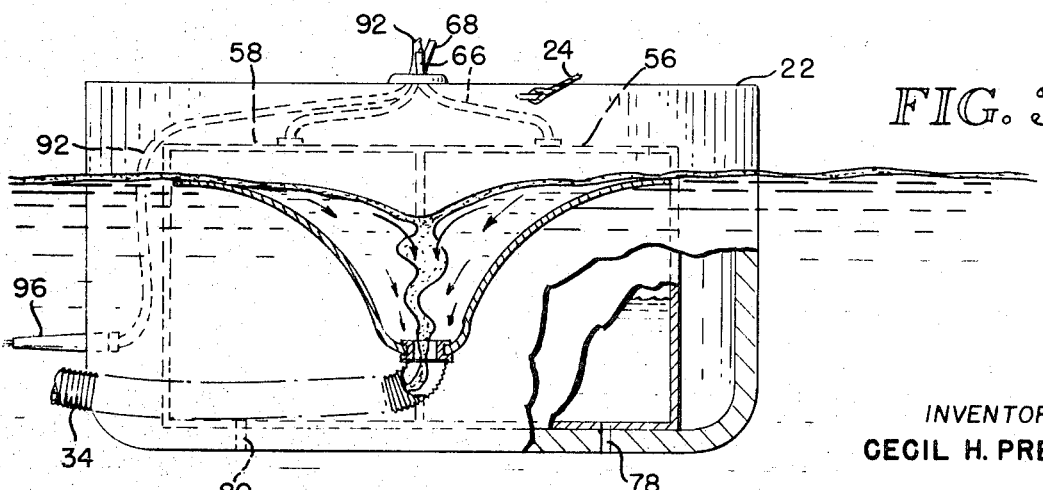
FIG. 3 is a sectional view taken in the direction indicated by line 3—3 in FIG. 2 and enlarged to show certain details of construction, with dotted lines and certain portions being cut away to indicate internal structural detail.
Figure 4:
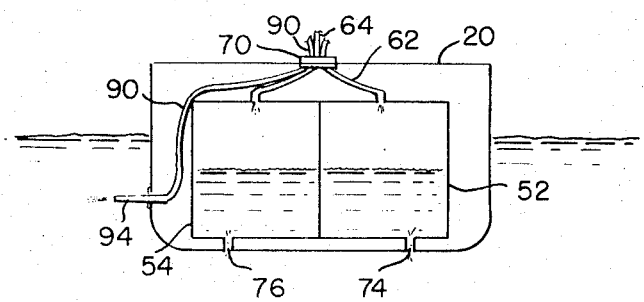
FIG. 4 is a sectional view taken in the direction indicated by line 4—4 in FIG. 2.

Also connected to the right and left-hand cowlings 20 and 22 are additional air supply lines 90 and 92, which pass through the grommets 70 and 72, respectively, and deliver air to right and left-hand propulsion nozzles 94 and 96 protruding aft from the cowlings as shown in FIGS. 1, 3 and 4. Propulsion valves 98 and 100 (FIG. 6) control the supply of air to these nozzles, compressed air being supplied from the air pressure storage tank 46 through a supply line 102. The control console includes individual controls P and Q for adjusting the relative amounts of air delivered to the right and left propulsion nozzles, thus permitting the operator to steer the skimmer through the water. An overall propulsion control R is provided for adjusting the total air volume delivered to both propulsion valves to control the speed of the skimmer. The control console may include pressure indicators to show the operator the pressures in all of the air tanks and lines and thereby assist him in guiding and controlling the skimming unit.

It will be understood that other nozzles may be provided to drive the unit backwards or sideways, and alternative means for propelling the skimming unit may be employed, such as small electrical motors driving propellers mounted on the skimming unit and controlled from the mother craft. Means other than compressed air lines controlled from the mother craft also may be provided for adjusting flotation of the skimming unit. The propulsion and flotation means described herein are illustrative of a preferred form of these aspects of the invention.

Figure 2:
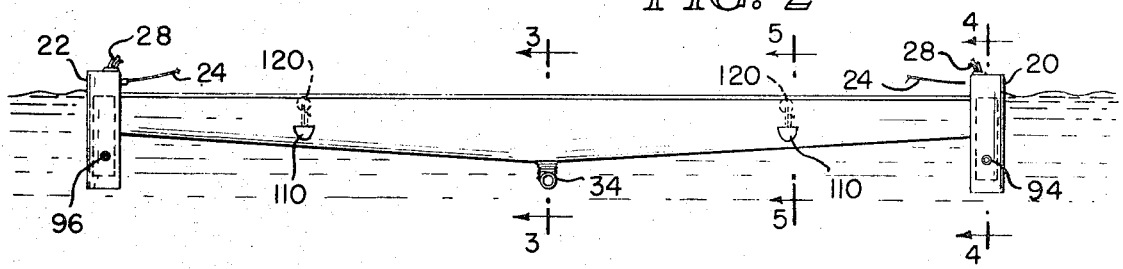
FIG. 2 is a rear view of the skimming unit shown in FIG. 1.
Figure 5:
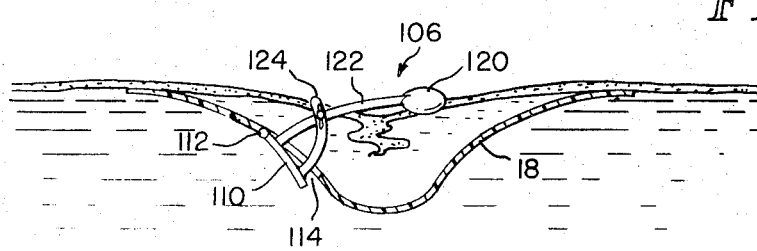
FIG. 5 is a sectional view taken in the direction indicated by line 5—5 in FIG. 2 (background detail omitted).

As previously indicated, the flotation level of the skimming unit is also adjustable by means of the pump outlet valve control 42 (FIGS. 1 and 6) which helps to control the volume of fluid contained in the skimmer. However, the operator cannot always respond quickly enough to wave conditions and other factors causing the skimmer to become too full or not full enough and hence to float too high or too low in the water. Therefore, to further assist him in controlling the flotation level, a pair of automatic flotation controls are preferably built into the skimmer unit itself, namely the right and left-hand float valves 106 and 108 (FIGS. 1, 2 and 5). Each of these valves includes a flap valve door 110 hinged at 112 to open and close the opening 114 and admit water to the trough 18 under control of the float 120 mounted on an arm 122 connected to the door 110. An adjustment arm 124 is provided in order to vary the level or position of the float 120 which will cause additional water to be admitted. When the trough 18 is filled to its optimum level by incoming oil and water flowing across the edges thereof, the valve is preferably closed to admit no supplementary water. However, if insufficient fluid is contained in the trough so that it begins to float too high in the water, the float 120 will drop and cause the flap valve door 110 to open, admitting supplementary water so that the skimmer can recover its optimum operating level. Thus the valves 106 and 108 cause a more immediate adjustment on either end of the trough to assist the operator in reacting to changing conditions, and any further necessary adjustment in the volume of water contained in the trough may be performed by adjustment of the pump outlet valve control 42.

In a second embodiment of the invention as illustrated in FIGS. 7 to 10, the skimming unit 126 has an oval, dish-like shape and is drawn through the water by a line 128 connected to the boom 130 extending forward from the bow of the craft 132. The boom 130, pivotally mounted on the mast structure 134, may be pulled to an upright position by the line 136 connected to the mast to lift the skimming unit out of the water. An extension 138 mounted on the end of the boom 130 permits the tether line 128 to be angled close to the water and thereby avoid a tendency for the mother craft to lift the skimmer out of the water during normal operation.

The compressed air propulsion means illustrated in FIGS. 1 to 4 is also applicable to the FIG. 7 embodiment of the invention, as are other propulsion means suggested previously. The combination of the dish-shaped skimmer and remotely controlled self-propulsion means are not shown in connection with this embodiment, since this and other combinations of the disclosed features within the scope of the invention may be visualized by those skilled in the art.

The shallow dish-shaped skimming unit of this embodiment is designed for operation in shallow water (where it may be manually maneuvered, if necessary) and is shaped to cause minimum wave distrubance of the oil slick or other floating substance. The oval shape of the unit permits the floating fluid being skimmed to be drawn into the skimmer across not only the leading and trailing edges 140 and 142 thereof, but also at the ends. The dish-like trough has a single continuous oval edge which is unbroken except for the upstanding fins which are included for visual sighting of the skimming unit during operation. Sharklike fins 144 and 146 at the right and left-hand ends, and 148 and 150 at center fore and aft locations are shaped to create minimum wave disturbance while providing a means by which the operator can visually estimate the depth of the skimmer during operation. The fins may be of triangular or other shape which enables the operator to judge the depth of the skimmer from the shape protruding above the surface of the fluid being skimmed, as well as to judge the angularity or pitch of the unit by noting the relative heights of the different fins.

The skimmer unit is constructed of fiberglass or other suitable light weight material. In place of the upstanding cowlings containing flotation or ballast tanks as illustrated in the embodiment first described, this embodiment includes a hollow bodied, double-wall structure, best shown in FIGS. 9 and 10, and includes quadrant tanks 152 and 154 on the right-hand side separated by a divider wall 153, and fore and aft tanks 156 and 158 on the left separated from each other by a divider wall 157 and from the right-hand tanks by divider walls 155 and 159. The quadrant tanks may be further compartmentalized or include vanes (not shown) to inhibit sloshing of the ballast water therein.

In this embodiment a submersible pump 160 is mounted directly on the skimming unit and pumps fluid from the opening 162 in the center of the unit through the flexible conduit 164 connected to a separator aboard the mother craft. A screen (not shown) may be placed over the opening 162 to prevent entry of large debris. Attached to the conduit 164 are air pressure lines 166 connected to the individual quadrant tanks and controlled in the same manner as illustrated in connection with the embodiment previously described. That is, both overall flotation and the angulation or pitch of the unit in the water during operation are controlled by introducing air into or withdrawing air from the quadrant tanks under controls manipulated by an operator from his remote position aboard the craft. Each quadrant tank includes an opening to the water in which the unit is operating for introduction or discharge of ballast water for flotation adjustment. These openings, 168, 170, 172 and 174, are preferably located near the center and bottom of the unit, while the individual air lines 176, 178, 180 and 182 deliver air to or withdraw air from upper regions of the built-in quadrant tanks, respectively.

The housing 184 which encloses the pump and the air lines as they enter the body of the skimming unit comprises a smooth extension of skimming unit body itself to cause minimum wave disturbance and minimize the likelihood of entanglement of the unit with seaweed or other floating debris. The unit may also include an automatic valve means (not shown) performing the same function as that illustrated in FIG. 5 in connection with the embodiment first described, to assist the operator in maintaining optimum flotation level of the unit.

Other modifications of the structures illustrated, within the scope and spirit of the invention, will be recognized by those skilled in the art.

What is claimed is:

1. In apparatus for skimming floating material from the surface of a body of water, wherein the apparatus includes a skimming unit floatable independently of a mother craft and moved under control thereof, the combination comprising:
    1. an independently floatable skimming unit which is elongated laterally with a relatively small fore-and-aft dimension to respond to fore-and-aft wave action, including an elongated trough extending laterally of the path of movement of the unit through the water and adapted to receive floatable material therein;
    2. means loosely coupling the skimming unit to the mother craft, including flexible conduit means for conducting the material and water from the skimming unit to the mother craft for separation; and
    3. propulsion means for propelling the skimming unit independent of the propulsion of the mother craft, including propulsion control means aboard the mother craft operative to vary the speed and direction of the unit ahead of the mother craft and substantially independently thereof within the limits defined by said coupling means.

2. The combination defined in claim 1 further comprising pump means coupled to the flexible conduit means and a pumping rate control operative to govern the rate at which the material and the water are delivered from the skimming unit to the mother craft.

3. The combination defined in claim 2 further comprising adjustable flotation means including a plurality of flotation tanks spaced both laterally and fore-and-aft of the unit, means for pumping ballast fluid to and from said tanks, and flotation control means aboard the mother craft for controlling pumping of ballast fluid to and from the tanks to adjust the respective flotation effects thereof and thereby vary the position of said unit relative to the water surface.

4. The combination defined in claim 3 wherein the skimming unit includes a pair of substantially upright housings each enclosing a pair of tanks adjacent to each end of said unit, wherein the fore and aft edges of said trough extend substantially in parallel between said housings.

5. The combination defined in claim 3 wherein said unit comprises a double-wall, hollow-bodied trough structure having a continuous horizontal edge around the periphery thereof, and wherein the ballast tanks comprise compartments within the hollow-bodied structure.

6. The combustion defined in claim 2 wherein said pump means comprises a submersible pump coupled to said skimming unit and adapted to be propelled through the water therewith in a submerged position.

7. The combination defined in claim 1 wherein the propulsion means comprises a source of compressed air aboard the mother craft, a plurality of nozzles mounted on said skimming unit and directed aft thereof, and means coupled to the propulsion control means for conducting compressed air from said source to said nozzles, respectively.

* * * * *